United States Patent
Fu et al.

(10) Patent No.: US 10,263,854 B2
(45) Date of Patent: Apr. 16, 2019

(54) SYSTEM AND METHOD FOR SUPPORTING VERSION BASED ROUTING IN A TRANSACTIONAL MIDDLEWARE MACHINE ENVIRONMENT

(71) Applicant: Oracle International Corporation, Redwood Shores, CA (US)

(72) Inventors: Huasheng Fu, Beijing (CN); Sheng Zhu, Beijing (CN); Zhenyu Li, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 294 days.

(21) Appl. No.: 13/915,495

(22) Filed: Jun. 11, 2013

(65) Prior Publication Data
US 2014/0033190 A1    Jan. 30, 2014

Related U.S. Application Data

(60) Provisional application No. 61/659,307, filed on Jun. 13, 2012.

(51) Int. Cl.
*H04L 12/24* (2006.01)
*G06F 8/71* (2018.01)

(52) U.S. Cl.
CPC .............. *H04L 41/20* (2013.01); *G06F 8/71* (2013.01); *H04L 41/5041* (2013.01)

(58) Field of Classification Search
CPC ......... H04L 67/10; H04L 47/70; H04L 63/08; H04L 65/60; H04L 41/20; H04L 41/50;
(Continued)

(56) References Cited

U.S. PATENT DOCUMENTS 5,572,675 A    11/1996   Bergler
6,212,557 B1 *  4/2001   Oran ................. G06F 9/465
                                                        709/220
(Continued)

FOREIGN PATENT DOCUMENTS

CN       1864160           11/2006
CN       101977220          2/2011
WO    2007044230 A2         4/2007

OTHER PUBLICATIONS

European Patent Office, International Searching Authority, International Search Report and Written Opinion dated Oct. 31, 2013 for Application No. PCT/US2013/045723, 11 pages.
(Continued)

*Primary Examiner* — Daniel C. Murray
*Assistant Examiner* — Kristoffer L S Sayoc
(74) *Attorney, Agent, or Firm* — Tucker Ellis LLP

(57) ABSTRACT

A system and method can support service management in a transactional middleware machine environment. A transactional service provider can dispatch at least one service using a plurality of service entries with different service versions, and determine whether a service version associated with a service entry matches a requested service version associated with a service request received from a service requester. Then, transactional service provider can allow the service requester to access the service entry that matches the requested service version associated with the service request.

19 Claims, 8 Drawing Sheets

(58) Field of Classification Search
CPC . H04L 41/5041; H04L 41/24; H04L 61/1511; H04L 65/40; G06F 8/71; G06F 8/60; G06F 15/173; G06Q 10/06; H04W 4/02
USPC .......................... 717/170; 709/223; 707/769
See application file for complete search history.

(56) References Cited

U.S. PATENT DOCUMENTS

| | | | |
|---|---|---|---|
| 7,277,453 | B2 | 10/2007 | Chin |
| 7,506,336 | B1* | 3/2009 | Ninan ............................ 717/175 |
| 7,783,666 | B1 | 8/2010 | Zhuge |
| 9,391,949 | B1* | 7/2016 | Richardson ......... H04L 61/1511 |
| 2003/0167349 | A1 | 9/2003 | Krohn et al. |
| 2004/0158737 | A1* | 8/2004 | Lo ............................ H04L 63/08 726/4 |
| 2004/0194102 | A1 | 9/2004 | Neerdaels |
| 2005/0030939 | A1 | 2/2005 | Roy et al. |
| 2005/0149294 | A1* | 7/2005 | Gebhart ................. G06Q 10/06 702/186 |
| 2006/0106842 | A1* | 5/2006 | Diament et al. .............. 707/101 |
| 2006/0155857 | A1* | 7/2006 | Feenan et al. ................ 709/227 |
| 2006/0161563 | A1* | 7/2006 | Besbris et al. ................ 707/100 |
| 2006/0174252 | A1 | 8/2006 | Besbris et al. |
| 2006/0294038 | A1* | 12/2006 | Grossfeld et al. ................ 707/1 |
| 2007/0083501 | A1 | 4/2007 | Pederson |
| 2008/0281969 | A1* | 11/2008 | Horton .................... H04W 4/02 709/227 |
| 2009/0296711 | A1* | 12/2009 | Kennedy et al. ............. 370/392 |
| 2010/0094919 | A1 | 4/2010 | Grossfeld |
| 2010/0169497 | A1 | 7/2010 | Klimentiev et al. |
| 2010/0312850 | A1 | 12/2010 | Deshpande |
| 2011/0202678 | A1* | 8/2011 | LaVoie .................. H04L 67/327 709/238 |

OTHER PUBLICATIONS

International Search Report dated Oct. 22, 2013 for Application No. PCT/US2013/045717, 10 pages.
International Search Report dated Oct. 31, 2013, International Application No. PCT/US2013/045723 filed Jun. 13, 2013, 4 pages.
State Intellectual Property Office of the People's Republic of China, Office Action dated Mar. 16, 2017 for Chinese Application No. 201380024093.5, 10 Pages.
State Intellectual Property Office of the People's Republic of China, Office Action dated Apr. 5, 2017 for Chinese Application No. 201380024077.6, 13 Pages.
Xiao, Zan et al., "Towards Dynamic Component Updating: A Flexible and Lightweight Approach", 2009 33rd Annual IEEE International Computer Software and Applications Conference, © 2009 IEEE.

* cited by examiner

SYSTEM AND METHOD FOR SUPPORTING VERSION BASED ROUTING IN A TRANSACTIONAL MIDDLEWARE MACHINE ENVIRONMENT

CLAIM OF PRIORITY

This application claims priority on U.S. Provisional Patent Application No. 61/659,307, entitled "SYSTEM AND METHOD FOR PROVIDING APPLICATION VERSION CONTROL IN A TRANSACTIONAL MIDDLEWARE MACHINE ENVIRONMENT" filed Jun. 13, 2012, which application is herein incorporated by reference.

CROSS REFERENCE TO RELATED APPLICATIONS

This application is related to the following patent application, which is hereby incorporated by reference in its entirety:

U.S. Patent Application entitled "SYSTEM AND METHOD FOR SUPPORTING IMPLICIT VERSIONING IN A TRANSACTIONAL MIDDLEWARE MACHINE ENVIRONMENT", application Ser. No. 13/915,482, filed Jun. 11, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting a transactional middleware machine environment.

BACKGROUND

The business systems that provide various services using enterprise IT architecture may involve complex and numerous stages. These business systems may need to handle various scenarios, such as changing the service contract for the end users, offering new service contracts for new customers, upgrading old services to new services in a non-stop mode, and keeping the older services for some existing customers. Furthermore, IT service providers may want to provide several versions of services in parallel, and offer specific variants to certain customers. Additionally, some services requesters may want to access different versions of services in a uniform manner or even switch between the different versions of services at runtime, while the others may not want to explicitly deal with the different service versions. This is the general area that embodiments of the invention are intended to address.

SUMMARY

Described herein are systems and methods for supporting service management in a transactional middleware machine environment. A transactional service provider can dispatch at least one service using a plurality of service entries with different service versions, and determine whether a service version associated with a service entry matches a requested service version associated with a service request received from a service requester. Then, transactional service provider can allow the service requester to access the service entry that matches the requested service version associated with the service request.

DETAILED DESCRIPTION

Figure 1:
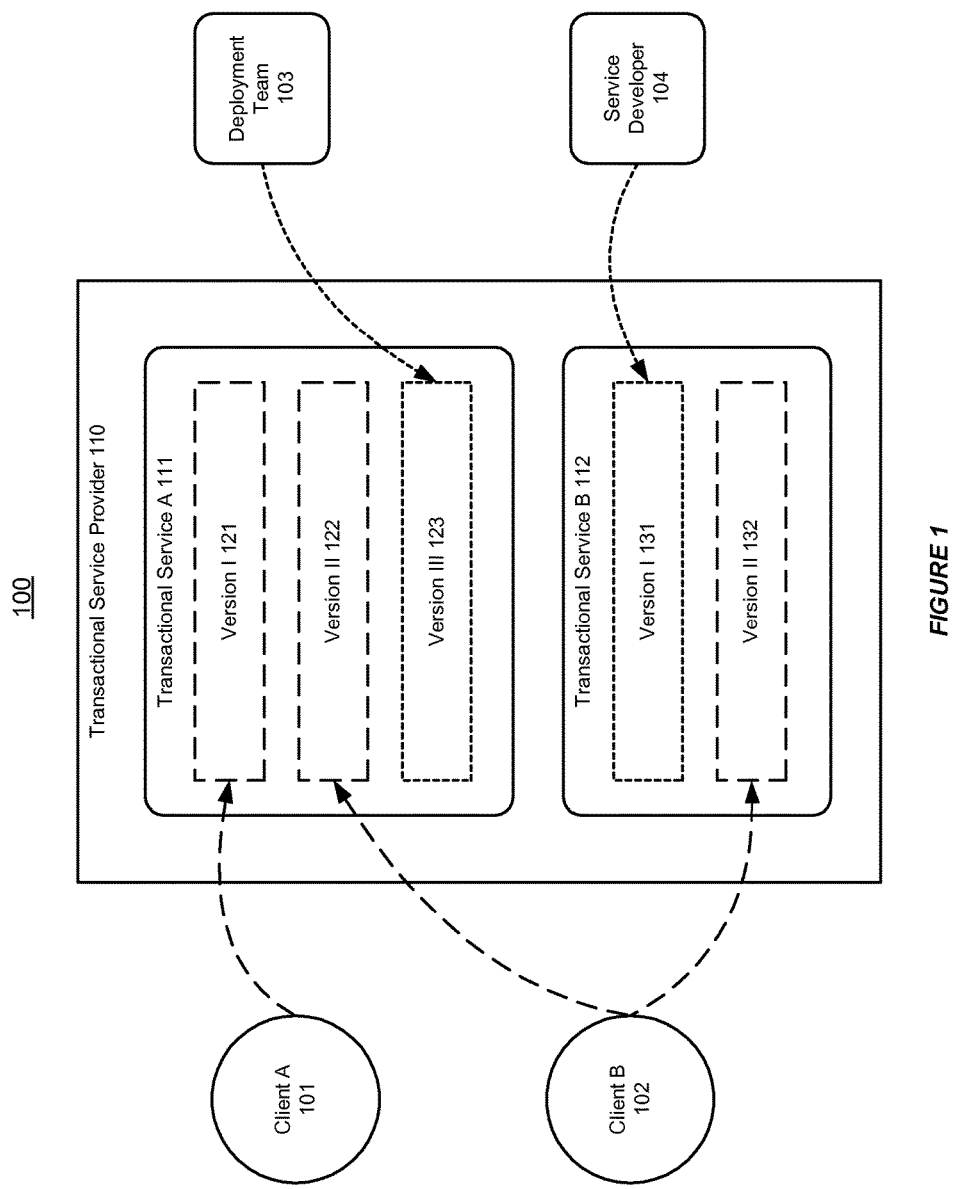
FIG. 1 shows an illustration of supporting application service versioning in a transactional middleware machine environment, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Described herein is a system and method for providing a middleware machine or similar platform. In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a transaction processing system or transaction oriented middleware or enterprise application server for C, C++, and COBOL. It is a set of software modules that enables the construction, execution, and administration of high performance, distributed business applications and has been used as transactional middleware by a number of multi-tier application development tools. Additionally, a transactional middleware system, such as a Tuxedo system, can take advantage of fast machines with multiple processors, such as Exalogic middleware machine, and a high performance network connection, such as an Infiniband (IB) network.

The description of the invention as following uses the Tuxedo system as an example for a transaction processing system. It will be apparent to those skilled in the art that other types of transaction processing system can be used without limitation.

Application Service Versioning

In accordance with an embodiment of the invention, a transaction middleware machine environment can support service versioning in order to reduce the client and server development effort. A transactional service provider, e.g. Tuxedo, can dispatch different services according to both a service name and a version that a service support. Also, a service requester, e.g. a client or a server/service that requests for a transactional service, may only have access to the service entry that supports a corresponding version.

FIG. 1 shows an illustration of supporting application service versioning in a transactional middleware machine environment, in accordance with an embodiment of the invention. As shown in FIG. 1, a transactional service provider 110 in a transaction middleware machine environment 100 can provide various services, such as transactional services A-B 111-112. The transactional service A 111 can include multiple service entries, e.g. versions I-III 121-123, while the transactional service B 112 can also include multiple service entries, e.g. versions I-II 131-132.

Furthermore, service versioning in a transactional middleware machine environment 100 can involve different people, such as the developers for client applications (e.g. clients A-B 101-102), the operation or management team, the deployment team 103, and the developers of services 104. Each of these parties may have their own different service version requirements.

As shown in FIG. 1, client A 101 can access version I 121 of transactional service A 111, while client B 102 can access version II 122 of transactional service A 111 and version II 132 of transactional service B 112. Thus, the developers of client applications A-B 101-102 can partition client requests into different transactional application services versions with the same service name. Also, the developers of client applications A-B 101-102 can switch current request context for applying different business logic to the same transactional application according to the input of client.

Additionally, at the runtime, the deployment team 103 can upgrade transactional applications logic in version III 123 of the transactional service A 111 in a non-stop mode, while continually handling old service logic in versions I-II 121-122. Also, the service developers 104 can update service logic in version I 131 of transactional service B 112 at the run time without disturbing current active service of version II 132 with the same service name.

Implicit Versioning

In accordance with an embodiment of the invention, the transaction middleware machine environment can support implicit versioning, which can be configuration driven and can provide a flexible way for a user to support application versioning.

Figure 2:
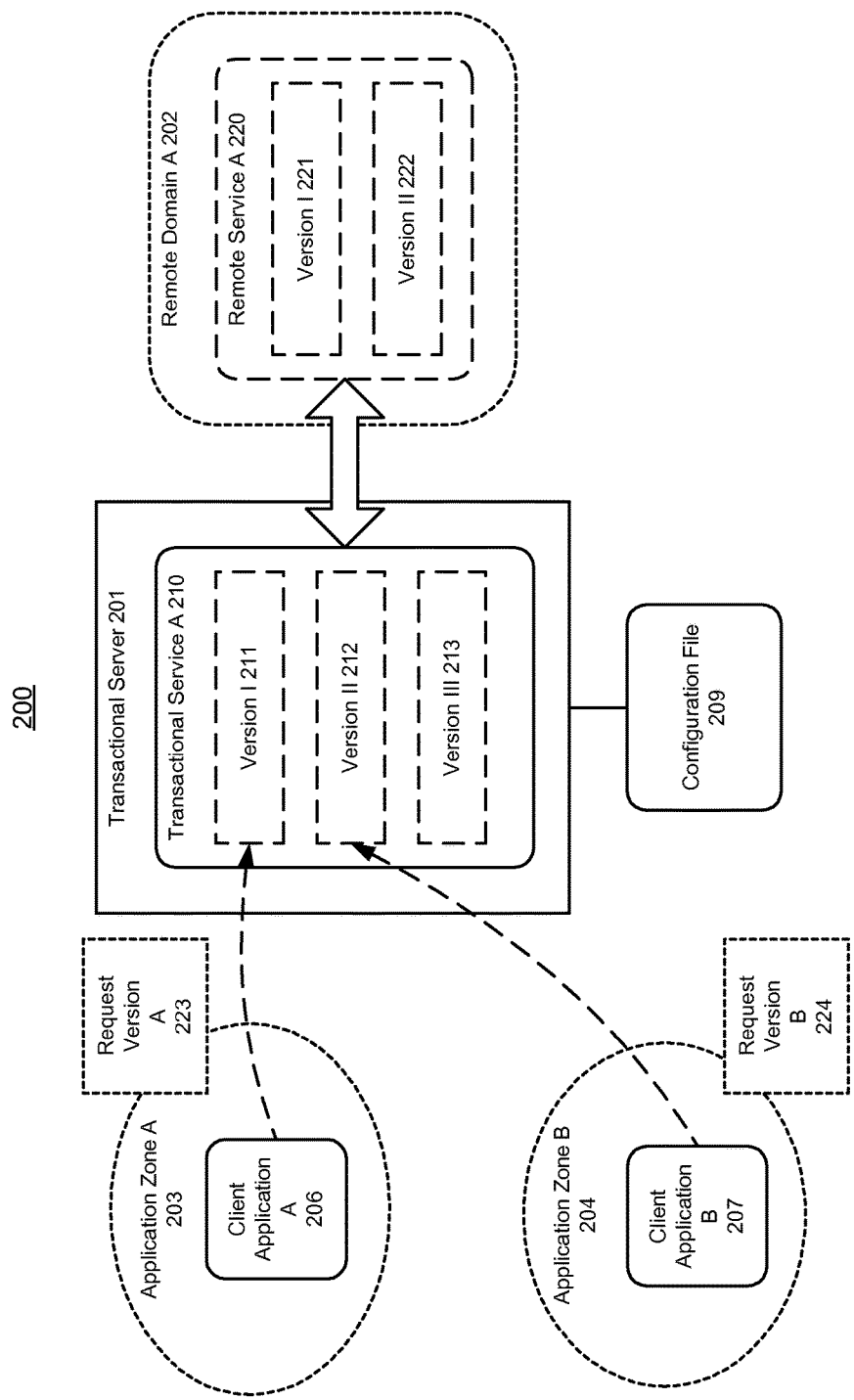
FIG. 2 shows an illustration of supporting implicit versioning in a transactional middleware machine environment, in accordance with an embodiment of the invention.

FIG. 2 shows an illustration of supporting implicit versioning in a transactional middleware machine environment, in accordance with an embodiment of the invention. As shown in FIG. 2, a transactional server 201 in a transactional middleware machine environment 200 can provide a transactional service A 210 in different versions, e.g. versions I-III 211-213.

In accordance with an embodiment of the invention, one or more configuration files 209 can be used for supporting implicit versioning. For example, the configuration file 209 can define a hierarchy relationship among the different levels in a management hierarchy.

As shown in FIG. 2, a user can partition various applications into different virtual zones, e.g. application zones A-B 203-204, based on version ranges. Each of the application zones A-B 203-204 can be configured to handle the service requests with a specific version number. For example, application zone A 203 can handle the service requests with a request version A 223 (e.g. version I), while application zone B 204 can handle the service requests with a request version B 224 (e.g. version II).

Additionally, the user can change the client request version and service version range at runtime. Such change, which can be made via a management interface, e.g. the MIB interface/API interface in Tuxedo, can take effect immediately at run time.

Furthermore, the users can enable/disable the application versioning feature through the configuration file 209. If application versioning is disabled, there can be no impact to an existing system. If application versioning is enabled, the system can provide a way for the users to set the client's/service's version and to configure the service support version range at different levels, e.g. at the application, and/or group level.

For example, in Tuxedo, both the UBB configuration files and the DMCONFIG configuration files can be used for supporting implicit application versioning. The customer can enable the application versioning feature by specifying a new application option, APPVER, in the OPTIONS section of the UBB configuration file. Additionally, the UBB configuration files and the DMCONFIG configuration files can include attributes, such as REQUEST_VERSION, VERSION_POLICY and VERSION_RANGE, for specifying the versions and the allowable version ranges in a configured Tuxedo management entity.

If the application versioning feature is enabled, a user can configure the application version related information in the UBB configuration file and the domain configuration files. On the other hand, if the application versioning feature is not enabled, the user may not configure the application version feature related configuration in UBB configuration file or through MIB interface. Also, if the customer disables the application versioning feature in UBB configuration file, the application version information in domain configuration may have no impact.

As shown in FIG. 2, client applications A-B 206-207 can make a request for the transaction service A 210 provided on the transactional server 201. The user can control the client request version and service range, via a configuration file 209. For example, in Tuxedo, the user can configure the application version related information on domain level and group level in UBB configuration file.

The REQUEST_VERSION in the UBB configuration file can be used to determine the version of the client that sends the request. The value of REQUEST_VERSION can be numeric, which is valid when it is equal to or greater than 0 and equal to or less than 65535(USHRT_MAX). Additionally, the default value for the REQUEST_VERSION can be '*', which indicates that the request version can be accepted by any version range and can call any versioned service.

The VERSION_RANGE in the UBB configuration file can be used to determine a range of allowable versioned request for the services. For example, a Tuxedo user can set a version range on a Tuxedo application at the group level for service selection to simplify the UBB configuration, using the format of "low_version_number-high_version_number", which indicates that low_version_number<=VERSION_RANGE<=high_version_number.

The VERSION_POLICY in the UBB configuration file can be used to determine version control policy. For example, a value can be "PROPAGATE", which indicates that the service should propagate the incoming request version instead of using its own request version when start a new request.

The VERSION_POLICY can precede the REQUEST_VERSION during service dispatching, i.e. if both the REQUEST_VERSION and VERSION_POLICY attributes are configured for a service, the service may propagate the incoming request version when start a new request.

The following Listing 1 includes various examples for specifying application versions in the Tuxedo configuration files.

In accordance with an embodiment of the invention, a user can use the configuration file 209 to configure the service version range for an imported service and to configure the service request version coming from a remote domain. For example, in Tuxedo, the user can configure the remote service, by introducing new attributes REQUEST_VERSION, VERSION_RANGE and VERSION_POLICY in domain configuration files.

The REQUEST_VERSION in the DMCONFIG configuration file can be used to define how to map the incoming service request version from specific remote domain, e.g. the remote domain A 202, to the configured request version in the local domain. A domain gateway can change the incoming request version, when the user configures the REQUEST_VERSION in domain configuration file, otherwise the domain gateway may propagate the incoming request version.

The VERSION_RANGE in the DMCONFIG configuration file can be used to indicate the version range of an imported remote service. This version range of the imported remote service can be the same as the version range of the corresponding exported service. Otherwise, the call may fail at remote domain even it can be accepted in the local domain.

Additionally, the VERSION_POLICY in the DMCONFIG configuration file can be used to determine version control policy. For example, a value can be "PROPAGATE", which can be used to determine whether the domain gateway will propagate/map the request version of an incoming client request from a specified remote domain to the configured request version. The version policy can override the request version in the DMCONFIG configuration file. I.e. the version policy can take precedence when both the VERSION_POLICY and the REQUEST_VERSION are configured. Furthermore, if the feature is enabled and the user does not configure the request version in domain configuration file, by default, the domain gateway can propagate the client request version across the domain gateway.

The following Listing 2 is an exemplary Tuxedo domain configuration file.

Listing 1

| Examples | Predicate |
|---|---|
| REQUEST_VERSION=2 VERSION_RANGE="0-3" VERSION_POLICY="PROPAGATE" | Request version is 2<br>0 <= VRESION_RANGE <= 3<br>The service propagate the incoming request version |
| REQUEST_VERSION=* VERSION_RANGE="0-4" | Request version is any version<br>0 <= VERSION_RANGE <= 4 |
| REQUEST_VERSION=2 VERSION_RANGE="1-4" | Request version is 2<br>1 <= VERSION_RANGE <= 4 |

As shown in FIG. 2, a remote service A 220 in a remote domain A 202 can make a request for a version of transactional service A 210 in a local domain. Also, the transaction service A 210 in the local domain can request for a remote service A 220 (i.e. version I 221 or version II 222) in the remote domain A 202.

Listing 2

*DM_REMOTE
　REMOTEDOM1 TYPE=TDOMAIN
　　DOMAINID=marketing MTYPE="Linux"

-continued

Listing 2

```
REMOTEDOM2 TYPE=TDOMAIN
    DOMAINID=marketing MTYPE="Linux"
    REQUEST_VERSION=4
*DM_IMPORT
    R_SVC1 RDOM= REMOTEDOM1 VERSION_RANGE="1-3"
    R_SVC2 RDOM= REMOTEDOM2 VERSION_RANGE="4-6"
```

The above domain configuration indicates that the request version for service request coming from REMOTEDOM1 may not be changed by the domain gateway, while the request version for service request coming from REMOTEDOM2 may be change to 4 by the domain gateway.

Furthermore, the domain gateway can import a remote service, R_SVC1, from REMOTEDOM1 with the version range set as 1-3, which indicates that only the client with request version in this range can call the R_SVC1 in local domain. The domain gateway can also import the remote service, R_SVC2, from REMOTEDOM2 with the version range set as 4-6, so that only the client with request version in that range can call R_SVC2 in the local domain.

Figure 3:
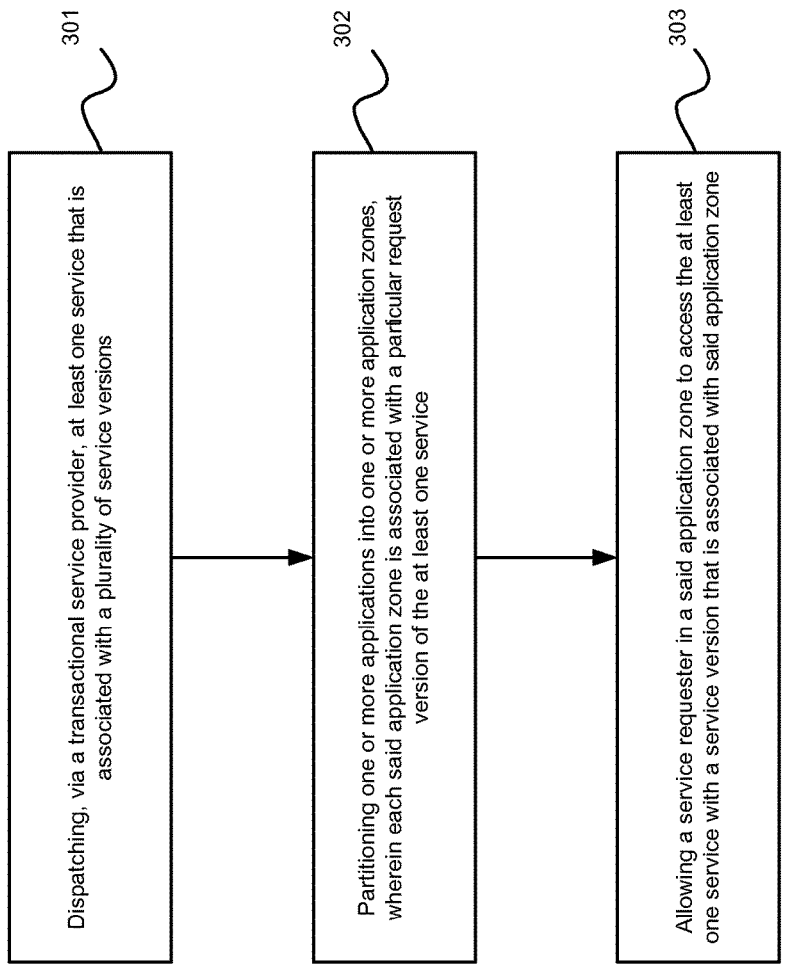
FIG. 3 illustrates an exemplary flow chart for supporting implicit versioning in a transactional middleware machine environment, in accordance with an embodiment of the invention.

FIG. 3 illustrates an exemplary flow chart for supporting implicit versioning in a transactional middleware machine environment, in accordance with an embodiment of the invention. As shown in FIG. 3, at step 301, a transactional service provider can dispatch at least one service that is associated with a plurality of service versions. Furthermore, at step 302, the system can partition one or more applications into one or more application zones, wherein each said application zone is associated with a particular request version of the at least one service. Then, at step 303, the system allows a service requester in a said application zone to access the at least one service with a service version that is associated with said application zone.

Version Context

In accordance with an embodiment of the invention, version context can be implicitly created by a request initiator according to how it joins a versioned application.

Figure 4:
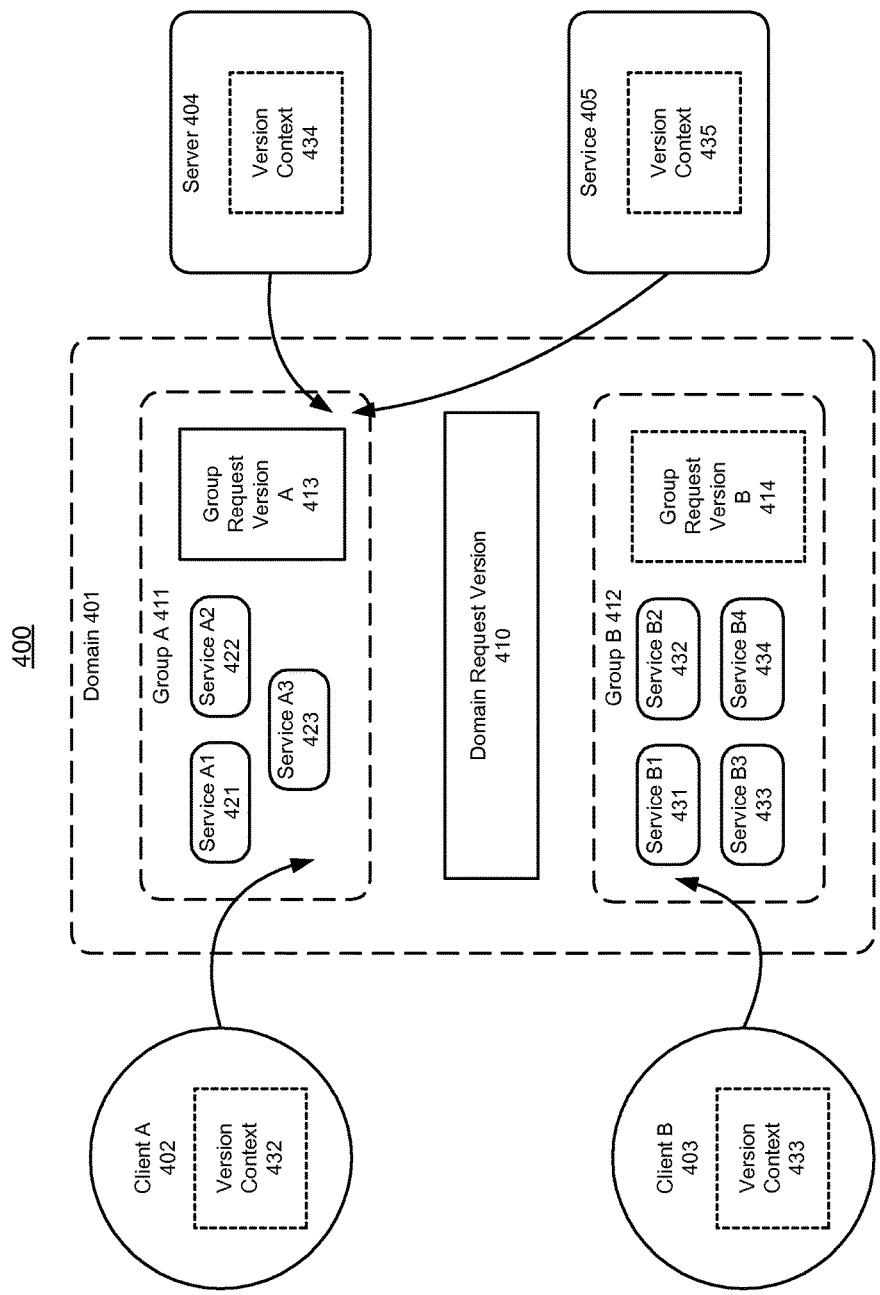
FIG. 4 shows an illustration of supporting version context in a transactional middleware machine environment, in accordance with an embodiment of the invention.

FIG. 4 shows an illustration of supporting version context in a transactional middleware machine environment, in accordance with an embodiment of the invention. As shown in FIG. 4, a versioned application 400 can be managed using a management hierarchy with multiple levels, such as a domain 401 with multiple groups A-B 411-412.

Furthermore, the domain 401 can be configured with a domain request version 410, while group A 411 can be configured with a group request version A 413. Thus, services A1-A3 421-423 in group A 411 can have a request version that is consistent with the group request version A 413.

Additionally, since group B 412 does not have a request version specified (or with an inactivated group request version B 414), services B1-B4 431-434 can have a service version number, which is inherited from the domain request version 410.

In accordance with an embodiment of the invention, the initial service requester can be implicitly put into a version context when joining a versioned application. Thus, the implicit versioning can be hierarchically dependent on how a service requester joins the versioned application. Also, the user can use the version context to control whether the version information may be propagated in the whole lifecycle of a service request, including the subsequent service routing and dispatching.

As shown in FIG. 4, client A 402 can join the versioned application 400 in group A 411, and can be implicitly associated with a version context 432 when it joins group A 411. Also, client B 403 can join the versioned application 400 in group B 412. Thus, client B 403 can be implicitly associated with a version context 433 when it joins group B 412.

Furthermore, a server 404 can be implicitly versioned, with a version context 434, when the server 404 initiates a new service request at runtime, and a service 405 can be implicitly versioned, with a version context 435, when the service 405 initiates a new request at runtime.

In accordance with an embodiment of the invention, implicit versioning can have different exceptions. For example, Tuxedo may not change the request version number in a forwarded request message, e.g. when calling tpforward, which forwards the input message to the specified service.

A Tuxedo Implicit Versioning Example

In Tuxedo, different service requesters (such as various servers and/or services, native clients, workstation clients, and JOLT clients) can implicitly acquire a version context value according to the UBB configuration, when starting a request. For example, the version context value can be a runtime value, which may only be evaluated, according to the UBB configuration file, when a Tuxedo client, server or service starts a request as an initiator.

Figure 5:
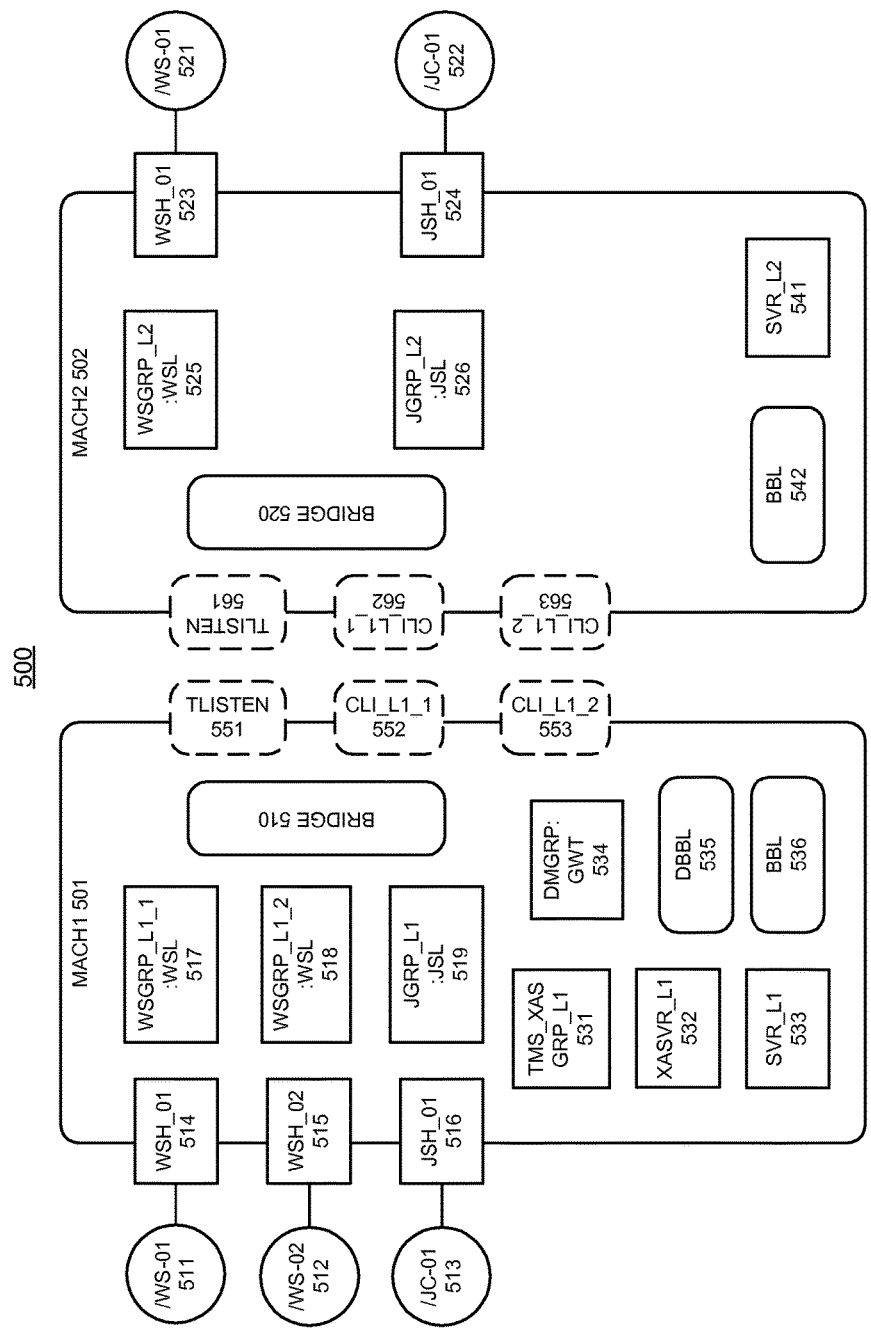
FIG. 5 shows an illustration of supporting a Tuxedo application deployed in a multi-process (MP) environment, in accordance with an embodiment of the invention.

FIG. 5 shows an illustration of supporting a Tuxedo multi-process (MP) environment, in accordance with an embodiment of the invention. As shown in FIG. 5, a Tuxedo application can be deployed in a multi-process (MP) environment 500 with multiple machines, e.g. MACH1 501 and MACH2 502. Furthermore, a configuration file can be used to configure the MP environment 500.

The following Listing 3 shows an exemplary UBB configuration file.

Listing 3

```
*RESOURCE
    REQUEST_VERSION     1
    VERSION_RANGE       "0-2000"
    MODEL               MP
*MACHINE
    MACH1               LMID=L1
    MACH2               LMID=L2
*GROUP
    DMGRP               LMID=L1    GRPNO=1000
    WSGRP_L1_1          LMID=L1    GRPNO=1100
                        REQUEST_VERSION=4 VERSION_RANGE="1-50"
    WSGRP_L1_2          LMID=L1    GRPNO=110
```

-continued

| Listing 3 | | |
|---|---|---|
| WSGRP_L2 | LMID=L1 GRPNO=1200 | |
| | REQUEST_VERSION=10 VERSION_RANGE="10-40" | |
| | VERSION_POLICY="PROPAGATE" | |
| JGRP_L1 | LMID=L1 GRPNO=1300 | |
| | REQUEST_VERSION=5 VERSION_RANGE="10-50" | |
| JGRP_L2 | LMID=L1 GRPNO=1400 | |
| | REQUEST_VERSION=10 VERSION_RANGE="10-40" | |
| GRP_L1 | LMID=L1 GRPNO=1500 | |
| | REQUEST_VERSION=20 VERSION_RANGE="1-40" | |
| | VERSION_POLICY="PROPAGATE" | |
| GRP_L2 | LMID=L2 GRPNO=1600 | |
| XAGRP_L1 | LMID=L1 GRPNO=1700 | |
| | TMSNAME="TMS_XAGRP_L1" | |
| | REQUEST_VERSION=11 VERSION_RANGE="1-30" | |
| *SERVERS | | |
| WSL | GROUP=WSGRP_L1_1 | SRVID=1001 |
| WSL | GROUP=WSGRP_L1_2 | SRVID=1001 |
| WSL | GROUP=WSGRP_L2 | SRVID=1001 |
| JSL | GROUP=JGRP_L1 | SRVID=1001 |
| JSL | GROUP=JGRP_L2 | SRVID=1001 |
| SVR_L1 | GROUP=GRP_L1 | SRVID=1001 |
| SVR_L2 | GROUP=GRP_L1 | SRVID=1001 |
| XASVR_L1 | GROUP=XAGRP_L1 | SRVID=1001 |
| *SERVICES | | |
| XASVR_L1 | | |

As shown in the Listing 3, REQUEST_VERSION, VERSION_POLICY and VERSION_RANGE attributes can be configured in the RESOURCE, GROUPS sections of the UBB configuration file.

For example, a group, GRP_L1, is configured the VERSION_RANGE, REQUEST_VERSION and VERSION_POLCIY attributes. Thus, the VERSION_RANGE, REQUEST_VERSION and VERSION_POLICY of all the servers and services in this group can be determined as inhering from the group configuration. As a result, the value of the VERSION_RANGE attributes for the servers, SVR_L1 533 and SVR_L2 541, in the GRP_L1 are "1-40." Also, the value of the REQUEST_VERSION attributes for SVR_L1 533 and SVR_L2 541 are 20; while both SVR_L1 533 and SVR_L2 541 can propagate the incoming request version.

On the other hand, no versioning attributes are configured for the group, GRP_L2, and the versioning attributes can be determined as inhering from the domain level (as specified in the RESOURCE section). Thus, the VERSION_RANGE of all the servers and/or services in this group is "0-2000;" the REQUEST_VERSION of all the servers and/or services in this group is 1. Because there is no VERSION_POLICY on domain level, all the servers and/or services in this group may use the request version 1, instead of propagating the incoming request version.

The request version from a workstation client can be determined according to the request version of the group that a related WSL server belongs to. Otherwise, the request version from a workstation client can be determined according to the request version for the domain (i.e. the REQUEST_VERSION value of WSL group and RESOURCES).

As shown in FIG. 5, workstation clients, e.g. /WS-01 511 and /WS-01 521, can access the service on MACH1 501 via handlers such as WSH_01 514 and WSH_02 515, which are managed by the server listeners, WSGRP_L1_1:WSL 517 and WSGRP_L1_2:WSL 518 respectively. Additionally, the workstation client, /WS-01 521, can access the service on MACH2 502 via a handler, WSH_01 523, which is managed by the server listener, WSGRP_L1_2:WSL 525.

Thus, the workstation client, /WS-01 511, can implicitly own the same REQUEST_VERSION context value as the WSGRP_L1_1:WSL 517, which is determined by the request version configuration of WSGRP_L1_1. Here, since the version number of WSGRP_L1_1 is configured as "4," the implicit version context value for /WS-01 511 can also be 4, which means that, when a workstation client in /WS-01 511 starts a request, its request version value is 4.

Furthermore, since the REQUEST_VERSION keyword value is not specified for WSGRP_L1_2, /WS-02 512 has the same version number as the local domain as specified in the RESOURCE section. Thus, according to the version hierarchy, the version context number of /WS-02 512 can be 1, which means that, when a workstation client from /WS-02 512 starts a new request, the request version of the request is 1.

Additionally, service request from different Jolt clients on /JC-01 513 or/JC-01 5522 can be handled by different handlers such as JSH_01 516 and JSH_01 524.

Similarly, the request version for service request from a Jolt client, e.g. /JC-01 513, can be determined according to the request version of the group, JGRP_L1, that the Jolt server listener (JSL), JGRP_L1:JSL 519, belongs to. Also, the request version for service request from a Jolt client, e.g. /JC-01 522, can be determined according to the request version of the group, JGRP_L2, that JGRP_L2:JSL 526, belongs to.

On the other hand, if the JSL group is not specified with a request version, the request version for service request from a Jolt client based on the request version of the local domain as specified in the RESOURCE section.

Furthermore, when a native client starts a new request, the native client can get the request version value at runtime from group/domain hierarchy tree, if the native client joins the application with specific group. Otherwise, the native client gets the request version value from the domain level.

As shown in FIG. 5, a native client, e.g. requesting the server XASVR_L1 532 on MACH1 501, can join the application with the specified group, e.g. XAGRP_L1. Thus, the native client can get the request version value from the group configuration, which is 11, at the run time. On the other hand, if the native client joins the application without a specified group, the native client can get the request version value from group/domain hierarchy tree at the run time.

In accordance with an embodiment of the invention, when a server/service starts a new request, the server/service can get the request version value from the group level that the server belongs to, or get the request version value from the domain level when no request version is defined at group level, at runtime.

For the user defined server, the implicit version can be determined by the REQUEST_VERSION value of server group and the REQUEST_VERSION value in the RESOURCES at the domain level. This version can be used as the request version when the server calls other services during server initialization or server termination.

For a service, the implicit version can be determined by the REQUEST_VERSION value of server group and the REQUEST_VERSION value in the RESOURCES at the domain level. It may also be impacted by the VERSION_POLICY configuration. This version can be used as the request version when the service calls other services during the service lifetime. If the service propagates the incoming request version, the service uses the incoming request version as the initial request version when calling other services.

Additionally, system servers (such as DBBL 535, BBL 536 and 542, BRIDGE 510 and 520, DMGRP:GWT 534, and event brokers), TMS server (such as TMS_XAGRP_L1 531), TLISTEN processes 551 and 561, and other interface processes (such as CLI_L1_1 552, CLI_L1_1 562, CLI_L1_2 553 and CLI_L1_2 563) may not be versioned. These system servers may always use the default version value, which is any.

Also, for the Tuxedo conversation call, the request version and version range can be set up during conversation connection setup phase (i.e. in tpconnect( )). There may not be version check in the conversation procedure on the established connection (i.e. in tpsend( )/tprecv( )). For the Tuxedo /Q, the system can support the version concept in FORWARD queue, to/from which the clients can send tpenqueue( )/pdequeue( ) messages. Thus, when the client put a message into the FORWARD queue, the FORWARD queue can forward the queued message to the service that supports the client request version.

Version Based Routing

In accordance with an embodiment of the invention, version based routing (VBR) can be supported in a transactional middleware machine environment.

Figure 6:
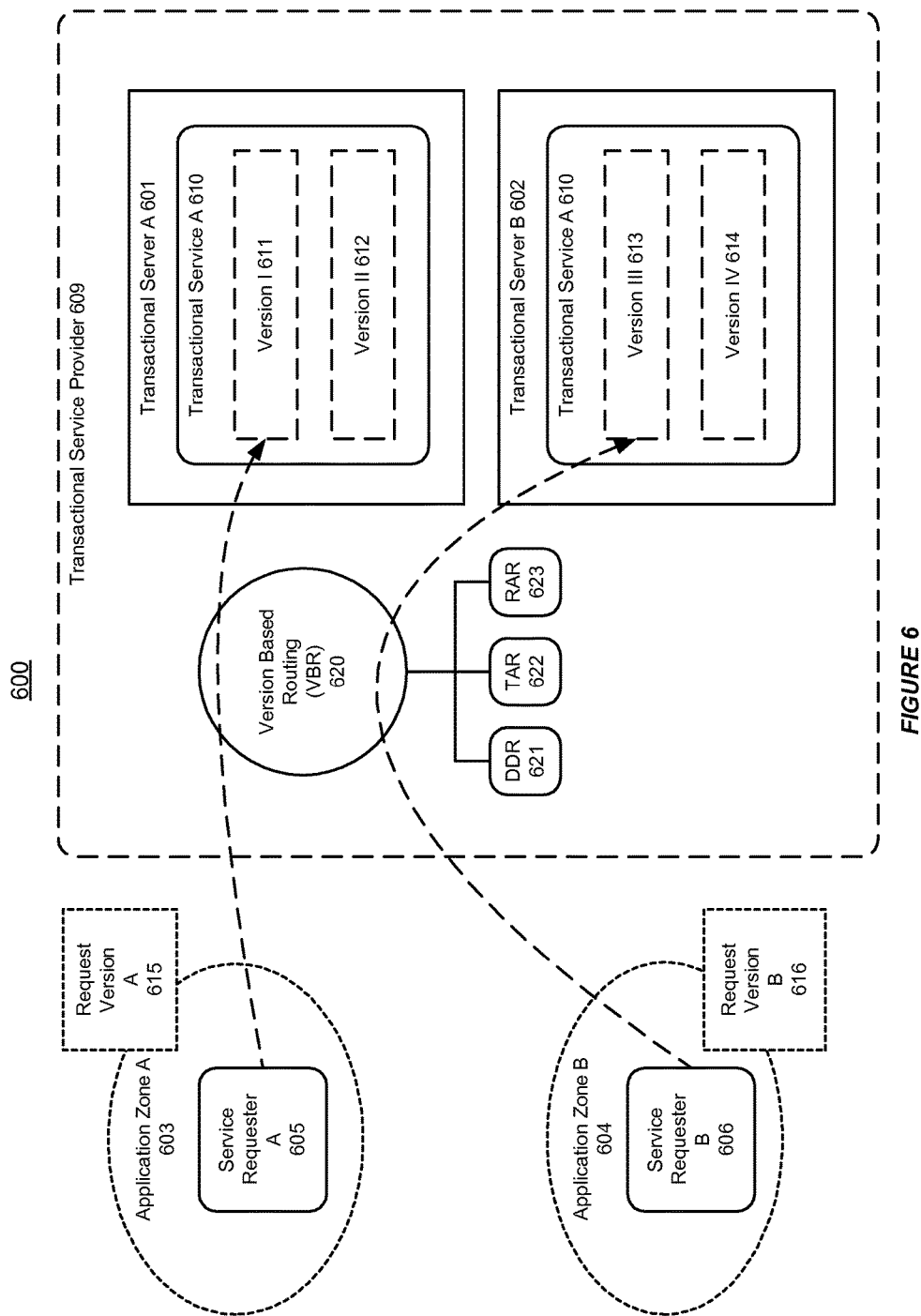
FIG. 6 shows an illustration of supporting version based routing (VBR) in a transactional middleware machine environment, in accordance with an embodiment of the invention.

FIG. 6 shows an illustration of supporting version based routing (VBR) in a transactional middleware machine environment, in accordance with an embodiment of the invention. As shown in FIG. 6, a transactional service provider 609 in a transactional middleware machine environment 600 can provide a transactional service A 610 on different transactional servers, e.g. transactional servers A-B 601-602.

For example, the transactional server A 601 can provide the service entries of versions I-II 611-612 (i.e. with a version range of 1-2), while the transactional server B 602 can provide the service entries of versions III-IV 613-614 (i.e. with a version range of 3-4).

Furthermore, the transactional service provider 609 can receive service requests from different service requesters, e.g. service requesters A-B 605-606. The transactional service provider 609 can match the requested service name in the service requests received the service requesters A-B 605-606 with the various service entries available. As shown in FIG. 6, the transactional service provider 609 can locate transactional servers A-B 601-602 because both transactional servers A-B 601-602 provide the transactional service A 610.

Then, the transactional service provider 609 can use a version based routing (VBR) 620 mechanism for making service routing decision, after one or more service entries that match the requested service name in a service request can be found. For example, VBR 620 can perform a numeric comparison of the request version number of a service request received from a service requester, e.g. either the service requester A 605 or the service requester B 606, with the two boundary values of the version range for both transactional server A 601 and transactional server B 602.

Here, the service request received from either the service requester A 605 or the service requester B 606 may not explicitly specify the request version number. Based on the implicit versioning configuration, the transactional service provider 609 can determine the requested service version associated with each service request. As shown in FIG. 6, a service requester A 605 in application zone A 603 is associated with a request version A 615 (e.g. version I), while a service requester B 606 in application zone B 604 is associated with a request version B 616 (e.g. version III).

As shown in FIG. 6, VBR 620 can rout the service request received from the service requester A 605 in application zone A 603 to transactional server A 601, which provides version I 611 of the transactional service A 610. Also, VBR 620 can rout the service request received from the service requester B 606 in application zone B 604 to transactional server B 602, which provides version III 613 of the transactional service A 610. Additionally, VBR can return "no entry is found" error to the caller when all of services with matching requested service name are not appropriate for a versioned service request.

Additionally, VBR 620 can be used together with the other routing mechanisms. For example, in Tuxedo, VBR 620 can be used together with several routing mechanisms, such as DDR (Data Dependent Routing) 621, TAR (Transaction Affinity Routing) 622, and RAR (Request Affinity Routing) 623.

For example, VBR 620 can be implemented using functions similar to those for the existing routing algorithms. Tuxedo can choose the services that match all criteria when there are multiple routing mechanisms. Also, the user can implement more complex routing scheme based on their understanding of how these routing mechanisms interact when multiple routing mechanisms are used together.

In accordance with an embodiment of the invention, a transactional service provider, e.g. Tuxedo, can offer various service selection and routing algorithms to the users, so that the users can plan, develop, scale, deploy, and upgrade their applications. Application versioning can be used for avoiding the use of special routing contexts and for meeting various partition requirements. For example, Tuxedo, as a part of infrastructure products in Oracle Fusion Middleware family, can support the service versioning concept in the core framework.

Figure 7:
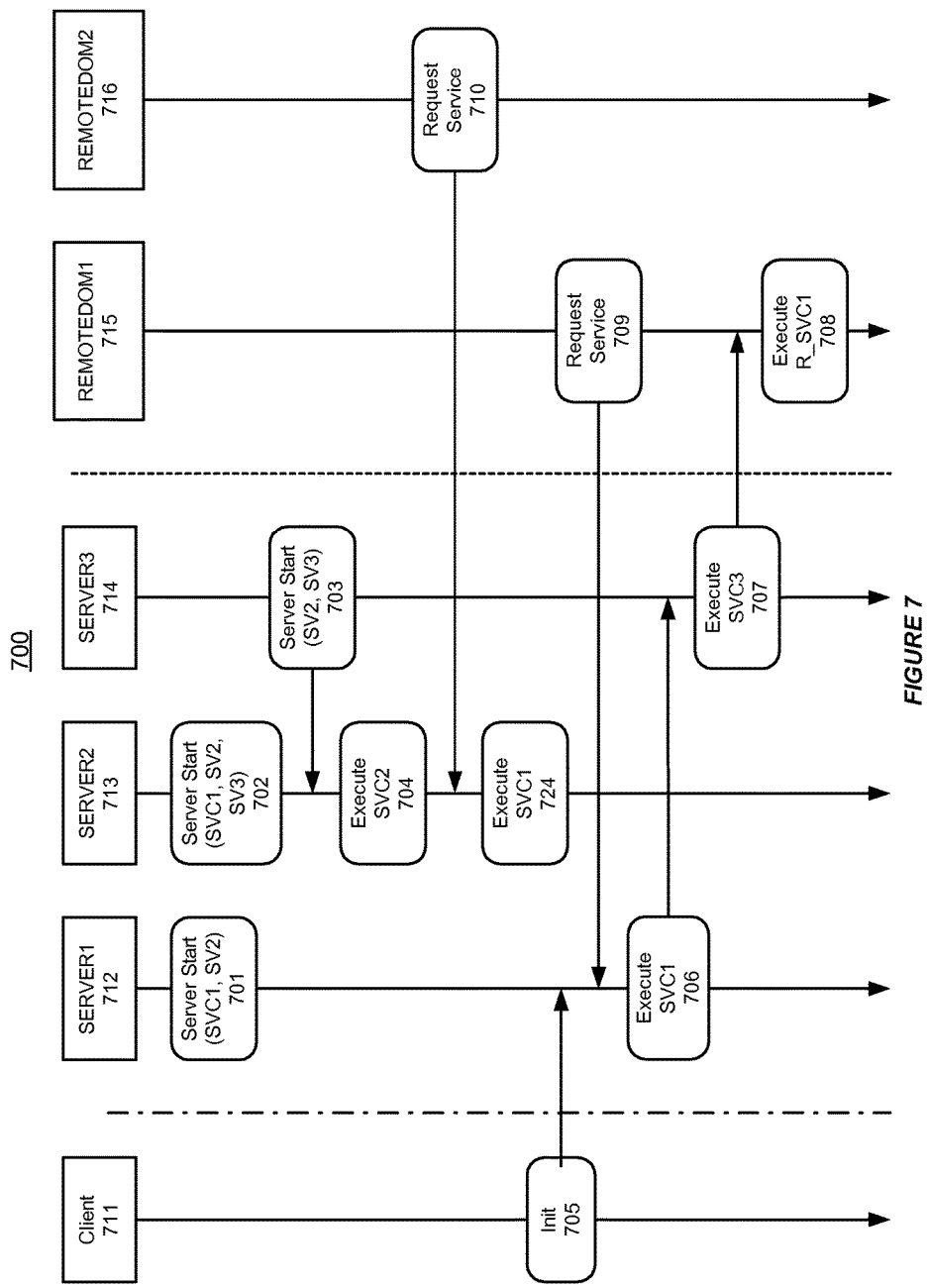
FIG. 7 shows an exemplary sequence chart for supporting version based routing (VBR) in a distributed transactional middleware machine environment, in accordance with an embodiment of the invention.

FIG. 7 shows an exemplary sequence chart for supporting version based routing (VBR) in a distributed transactional middleware machine environment, in accordance with an embodiment of the invention. As shown in FIG. 7, a transactional middleware machine environment 700 can include several transactional servers (e.g. SERVER1 712, SERVER2 713, and SERVER1 3 714) that can provide various services (e.g. SVC1, SVC2, and SVC 3) to different clients (e.g. client 711).

Furthermore, one or more configuration files, such as a Tuxedo UBB configuration file, and a Tuxedo DUBB configuration file, can be used to configure the transactional middleware machine environment 700.

The following Listing 4 is an exemplary Tuxedo UBB configuration file.

Listing 4

```
*RESOUCE
    DOMAINID LOCALDOM
        REQUEST_VERSION 1   VERSION_RANGE "1-2"
*GROUP
    GRP1   GRPNO=1 REQUEST_VERSION=2
           VERSION_POLICY="PROPAGATE"
    GRP2   GRPNO=2 VERSION_RANGE="3-4"
    GRP3   GRPNO=3 REQUEST_VERSION=3
           VERSION_RANGE="1-3"
    DMGRP  GRPNO=4 LMID=SITE1
    GWGRP  GRPNO=5 LMID=SITE1
*SERVER
    SERVER1 SVRGRP=GRP1
    SERVER2 SVRGRP=GRP2
    SERVER3 SVRGRP=GRP3
    DMADM SVRGRP=DMGRP
    GWADM SVRGRP=GWGRP
    GWTDOMAIN SVRGRP=GWGRP
```

The following Listing 5 is an exemplary Tuxedo DUBB configuration file.

Listing 5

```
*DM_REMOTE
    REMOTEDOM1  TYPE=TDOMAIN
    DOMAINID=marketing MTYPE="Linux"
    REMOTEDOM2  TYPE=TDOMAIN
    DOMAINID=marketing MTYPE="Linux"
    REQUEST_VERSION=4
*DM_IMPORT
    R_SVC1  RDOM=REMOTEDOM1 VERSION_RANGE="1-3"
    R_SVC2  RDOM=REMOTEDOM2 VERSION_RANGE="4-6"
```

As shown in FIG. 7, at step 701, SERVER 1 712 starts and advertises services, SVC1 and SVC2 with a version range of "1-2;" and at step 702, SERVER2 713 starts and advertises services, SVC1, SVC2, and SVC3 with a version range of "3-4."

At step 703, SERVER3 714 starts and can request a service of SVC2, e.g. via calling "tpcall svc2." Based on the above Listing 4, SERVER3 714 belongs to a group "GRP3," the request version of which is evaluated as "3." Thus, the system can rout the service request to SERVER2 713, since the request version, "3," associated with the service request matches to the version range of SVC2 as advertised by the SERVER2 703. Then, at step 704, SERVER2 713 can execute SVC2 before SERVER3 704 can advertise services, SVC2 and SVC3 with a version range of "1-3."

Furthermore, at step 705, the client 711 can initialize a transaction with a service request for SVC1, e.g. via calling "tpcall svc1," with the request version "1." The system can rout this service request to SERVER1 712, the version range of which matches the request version "1" of the service request received from the client 711.

Then, at step 706, SERVER1 712 can execute SVC1, which in turn calls "tpcall svc3." The system can rout this call to SERVER3 714. At step 707, SERVER3 714 can execute SVC3, and can place a call to REMOTEDOM1 715 for service, R_SVC1, e.g. via calling a "tpcall R_SVC1" with a request version 3. Thus, the system can rout this service request to REMOTEDOM1 715, as indicated in Listing 5. At step 708, REMOTEDOM1 715 can execute the remote service, R_SVC1.

Additionally, the local domain may recieve service requests from remote domains (e.g. REMOTEDOM1 715 and REMOTEDOM2 716). As shown in FIG. 7, REMOTEDOM1 715 and REMOTEDOM2 716 both initiate a service request operation of "tpcall svc1," at steps 709 and 710 respectively.

Based on the configuration in Listing 5, the service request received from REMOTEDOM1 715, which has an original request version of "2" can be propagated. Thus, the system can rout this service request to SERVER1 712. Then, the system can perform the steps 706-708 for providing the requested service to a service requester in REMOTEDOM1 715.

Also, the service request received from REMOTEDOM1 716, which has an original request version of "6," can be changed to have a request version of "4," Thus, the system can rout this service request to SERVER2 703 and execute the requested service, SVC1, at step 724.

Figure 8:
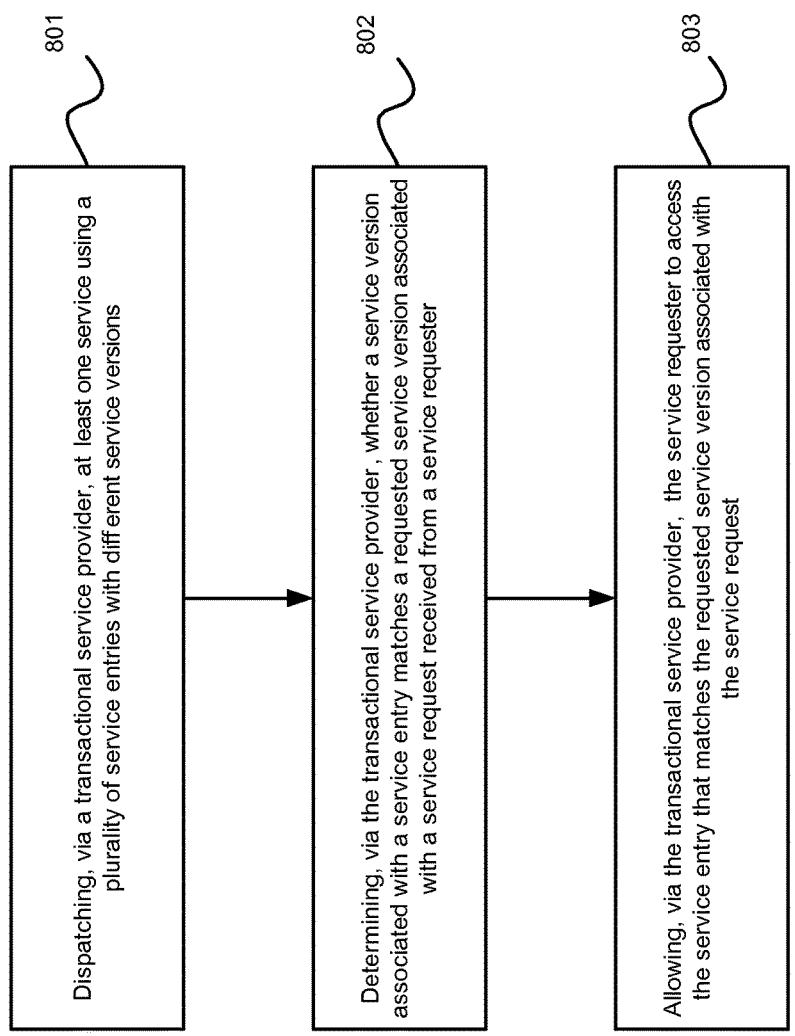
FIG. 8 illustrates an exemplary flow chart for supporting version based routing (VBR) in a transactional middleware machine environment, in accordance with an embodiment of the invention.

FIG. 8 illustrates an exemplary flow chart for supporting version based routing (VBR) in a transactional middleware machine environment, in accordance with an embodiment of the invention. As shown in FIG. 8, at step 801, a transactional service provider can dispatch at least one service using a plurality of service entries with different service versions. Furthermore, at step 302, the transactional service provider can determine whether a service version associated with a service entry matches a requested service version associated with a service request received from a service requester. Then, at step 803, the transactional service provider allows the service requester to access the service entry that matches the requested service version associated with the service request.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting service version based routing in a transactional middleware machine environment, the method comprising:

dispatching, by a transactional service provider to an associated first transactional server, a first set of versions of a service having a service name and comprising a first set of service version identifiers associated with a corresponding first set of service entries to the first set of versions of the service on the associated first transactional server;

dispatching by the transactional service provider to an associated second transactional server different than the first transactional server a second set of versions of the service having the service name and comprising a second set of service version identifiers associated with a corresponding second set of service entries to the second set of versions of the service on the associated second transactional server;

using a version range, partitioning one or more client applications into a plurality of client application zones, wherein a first client application zone is associated with a first request version of the service and a second client application zone is associated with a second request version of the service;

associating an associated service requester with a context when the associated service requester joins a versioned client application in one of the first or second client application zones;

determining, by the transactional service provider, whether a requested service name associated with a service request received from the associated service requester matches the service name;

determining, by the transactional service provider based on a first attribute of a configuration file associated with the service request, whether an application versioning feature is enabled;

responsive to determining that the application versioning feature is enabled and to determining that the requested service name matches the service name, determining, by the transactional service provider based on a requested service version of the service implied by the transactional service provider to be the first request version of the service based on the associated service requester being in the first client application zone or the second request version of the service based on the associated service requester being in the second client application zone, whether the requested service version matches at least one of the first set of service version identifiers of the first set of versions of the service or the second set of service version identifiers of the second set of versions of the service; and routing, by the transactional service provider based on determining that the requested service version matches at least one of the first or second sets of service version identifiers, the associated service requester to access, using the context associated with the associated service requester:

a one of the first set of versions of the service on the associated first transactional server via a first service entry of the first set of service entries having a first service version identifier that matches the first request version associated with the service request, or a one of the second set of versions of the service on the associated second transactional server via a second service entry of the second set of service entries having a second service version identifier that matches the second request version associated with the service request.

2. The method according to claim 1, further comprising: returning an error message to the associated service requester when all service entries having the requested service name do not match the requested service version.

3. The method according to claim 1, further comprising: performing, via the transactional service provider, a numeric comparison between the requested service version and boundary values of the version range.

4. The method according to claim 1, further comprising: allowing the associated service requester to be one of a client application or a remote service.

5. The method according to claim 1, wherein the routing comprises:
performing the routing using at least one of:
a data dependent routing (DDR) algorithm,
a transaction affinity routing (TAR) algorithm, and/or
a request affinity routing (RAR) algorithm.

6. The method according to claim 1, further comprising: using a transactional service application configuration to determine the requested service version associated with the service request.

7. The method according to claim 6, further comprising: using the configuration file to provide the transactional service application configuration; and
using a management interface to change the transactional service application configuration at runtime.

8. A system for supporting version based routing in a network environment, the system comprising:
one or more microprocessors;
a transactional service provider, running on the one or more microprocessors, wherein the transactional service provider operates to:
dispatch, by the transaction service provider to an associated first transactional server, a first set of versions of a service having a service name and comprising a first set of service version identifiers associated with a corresponding first set of service entries to the first set of versions of the service on the associated first transactional server;
dispatch, by the transactional service provider to an associated second transactional server different than the first transactional server, a second set of versions of the service having the service name and comprising a second set of service version identifiers associated with a corresponding second set of service entries to the second set of versions of the service on the associated second transactional server;
using a version range to partition one or more client applications into a plurality of client application zones, wherein a first client application zone is associated with a first request version of the service and a second client application zone is associated with a second request version of the service;
associate an associated service requester with a context when the associated service requester joins a versioned client application in one of the first or second client application zones;
determine whether a requested service name associated with a service request received from the associated service requester matches the service name;
determine, based on a first attribute of a configuration file associated with the service request, whether an application versioning feature is enabled;
responsive to determining that the application versioning feature is enabled and to determining that the requested service name matches the service name, determine, based on a requested service version of the service implied by the transactional service provider to be the first request version of the service based on the associated service requester being in the first client application zone or the second request version of the service based on the associated service requester being in the second client application zone, whether the requested service version matches at least one of the first set of service version identifiers of the first set of versions of the service or the second set of service version identifiers of the second set of versions of the service; and routing, based on determining that the requested service version matches at least one of the first or second sets of service version identifiers, the associated service requester to access, using the context associated with the associated service requester:
- a one of the first set of versions of the service on the associated first transactional server via a first service entry of the first set of service entries having a first service version identifier that matches the first request version associated with the service request, or
- a one of the second set of versions of the service on the associated second transactional server via a second service entry of the second set of service entries having a second service version identifier that matches the second request version associated with the service request.

9. The system according to claim 8, wherein:
the transactional service provider operates to return an error message to the associated service requester when all service entries having the requested service name do not match the requested service version.

10. The system according to claim 8, wherein:
the transactional service provider operates to perform a numeric comparison between the requested service version and boundary values of the version range.

11. The system according to claim 8, wherein:
the associated service requester is one of a client application or a remote service.

12. The system according to claim 8, wherein:
the transactional service provider operates to perform the routing using at least one of:
- a data dependent routing (DDR) algorithm,
- a transaction affinity routing (TAR) algorithm, and/or
- a request affinity routing (RAR) algorithm.

13. The system according to claim 8, wherein:
the transactional service provider operates to use a transactional service application configuration to determine the requested service version associated with the service request.

14. The system according to claim 13, wherein:
the transactional service provider operates to:
use the configuration file to provide the transactional service application configuration, and
use a management interface to change the transactional service application configuration at runtime.

15. A non-transitory machine readable storage medium having instructions stored thereon that when executed cause a system to perform version based routing steps comprising:
dispatching, by a transactional service provider to an associated first transactional server, a first set of versions of a service having a service name and comprising a first set of service version identifiers associated with a corresponding first set of service entries to the first set of versions of the service on the associated first transactional server;

dispatching by the transactional service provider to an associated second transactional server different than the first transactional server a second set of versions of the service having the service name and comprising a second set of service version identifiers associated with a corresponding second set of service entries to the second set of versions of the service on the associated second transactional server;

using a version range, partitioning one or more client applications into a plurality of client application zones, wherein a first client application zone is associated with a first request version of the service and a second client application zone is associated with a second request version of the service;

associating an associated service requester with a context when the associated service requester joins a versioned client application in one of the first or second client application zones;

determining, by the transactional service provider, whether a requested service name associated with a service request received from the associated service requester matches the service name;

determining, by the transactional service provider based on a first attribute of a configuration file associated with the service request, whether an application versioning feature is enabled;

responsive to determining that the application versioning feature is enabled and to determining that the requested service name matches the service name, determining, by the transactional service provider based on a requested service version of the service implied by the transactional service provider to be the first request version of the service based on the associated service requester being in the first client application zone or the second request version of the service based on the associated service requester being in the second client application zone, whether the requested service version matches at least one of the first set of service version identifiers of the first set of versions of the service or the second set of service version identifiers of the second set of versions of the service; and routing, by the transactional service provider based on determining that the requested service version matches at least one of the first or second sets of service version identifiers, the associated service requester to access, using the context associated with the associated service requester:
- a one of the first set of versions of the service on the associated first transactional server via a first service entry of the first set of service entries having a first service version identifier that matches the first request version associated with the service request, or
- a one of the second set of versions of the service on the associated second transactional server via a second service entry of the second set of service entries having a second service version identifier that matches the second request version associated with the service request.

16. The method according to claim 1, further comprising:
selectively overriding, by the transactional service provider, the requested service version and replacing the requested service version with a configured request version in accordance with version policy data.

17. The method according to claim 1, wherein the determining by the transactional service provider whether the requested service version matches at least one service version identifier of the first and second sets of service versions of the service comprises:

determining whether one or more of:
        i) a domain request version of a domain of versioned applications,
        ii) a group request version of a group of one or more services within the domain of versioned applications, or
        iii) a service version number of a service in the domain of versioned applications and not belonging to the group of one or more services.

18. The method according to claim 1, wherein the determining by the transactional service provider based on the second attribute of the configuration file whether the requested service version matches at least one of the first service version identifier of the first version of the service or the second service version identifier of the second version of the service comprises one or more of:

determining a version of the associated service requester using a REQUEST_VERSION parameter in a configuration file of the transactional service provider as the second attribute of the configuration file comprising the application version related information, determining a range of allowable versioned requests for services of the requested service name using a VERSION RANGE parameter in the configuration file of the transactional service provider as the second attribute of the configuration file comprising the application version related information, and/or determining a version control policy using a VERSION_POLICY parameter in the configuration file of the transactional service provider as the second attribute of the configuration file comprising the application version related information.

19. The method according to claim 18, further comprising:

controlling one or more of a client request version of the service request received from the associated service requester and/or a service range of the service request received from the associated service requester using the configuration file of the transactional service provider as the second attribute of the configuration file comprising the application version related information.

* * * * *

UNITED STATES PATENT AND TRADEMARK OFFICE
CERTIFICATE OF CORRECTION

PATENT NO. : 10,263,854 B2
APPLICATION NO. : 13/915495
DATED : April 16, 2019
INVENTOR(S) : Fu et al.

Page 1 of 1

It is certified that error appears in the above-identified patent and that said Letters Patent is hereby corrected as shown below:

In the Specification

In Column 5, Line 51, delete "VRESION" and insert -- VERSION --, therefor.

In Column 13, Line 65, delete "recieve" and insert -- receive --, therefor.

Signed and Sealed this
Third Day of November, 2020

Andrei Iancu
*Director of the United States Patent and Trademark Office*